US012632381B2

(12) United States Patent
Yang et al.

(10) Patent No.: US 12,632,381 B2
(45) Date of Patent: May 19, 2026

(54) METHOD OF DECOMMISSIONING A SOLID-STATE DRIVE

(71) Applicant: Microchip Technology Incorporated, Chandler, AZ (US)

(72) Inventors: Nian Niles Yang, Mountain View, CA (US); Pitamber Shukla, San Jose, CA (US); Srinivas Yelisetti, Fremont, CA (US); Hichem Belhadj Mohamed, Loomis, CA (US)

(73) Assignee: Microchip Technology Incorporated, Chandler, AZ (US)

( * ) Notice: Subject to any disclaimer, the term of this patent is extended or adjusted under 35 U.S.C. 154(b) by 20 days.

(21) Appl. No.: 18/939,815

(22) Filed: Nov. 7, 2024

(65) Prior Publication Data

US 2026/0056876 A1     Feb. 26, 2026

Related U.S. Application Data

(60) Provisional application No. 63/687,091, filed on Aug. 26, 2024.

(51) Int. Cl.
G06F 12/00        (2006.01)
G06F 12/02        (2006.01)

(52) U.S. Cl.
CPC ............................... G06F 12/0246 (2013.01)

(58) Field of Classification Search
CPC .. G06F 12/0246; G06F 21/575; G06F 9/4401; G06F 3/06; G11C 29/00; G11C 11/34
(Continued)

(56) References Cited

U.S. PATENT DOCUMENTS

| | | | |
|---|---|---|---|
| 5,946,257 A | 8/1999 | Keeth | |
| 9,230,112 B1 * | 1/2016 | Peterson | G06F 21/76 |

(Continued)

FOREIGN PATENT DOCUMENTS

| | | | | |
|---|---|---|---|---|
| DE | 102016100833 A1 * | 7/2016 | | G06F 21/88 |
| EP | 0657821 A2 * | 6/1995 | | G06F 21/79 |

(Continued)

OTHER PUBLICATIONS

International Search Report and Written Opinion for PCT Application No. PCT/US2024/054841 (Dated Mar. 21, 2024).

*Primary Examiner* — Mardochee Chery
(74) *Attorney, Agent, or Firm* — Hovey Williams LLP

(57) ABSTRACT

A method of decommissioning a solid-state drive including a non-volatile memory media and a controller. Decommissioning is achieved by a disabling command sequences, internal communication channels, and interfaces. A non-volatile memory media is permanently disabled by short circuiting an internal high voltage generator to an electrical ground so that a high voltage cannot be generated for an operation required to access data on the memory media. The short circuit path may be enabled using a one-time programmable element. Further, an ability of a non-volatile memory media interface to initiate a command sequence that is required to access the memory media is disabled, and a status confirmation indicating that the memory media has been disabled is issued. A controller is also permanently disabled by disabling an ability of a flash interface to communicate with the non-volatile memory media so that no commands can be received by the memory media.

20 Claims, 4 Drawing Sheets

(58) Field of Classification Search
USPC ......................................................... 711/103
See application file for complete search history.

(56) References Cited

U.S. PATENT DOCUMENTS

| 12,333,151 | B2 * | 6/2025 | Dubeyko | .............. G06F 3/0688 |
|---|---|---|---|---|
| 2006/0253667 | A1 | 11/2006 | Merry et al. | |
| 2009/0153181 | A1 | 6/2009 | Kinsley | |
| 2019/0099971 | A1 * | 4/2019 | Gutierrez | ............ B02C 19/0056 |
| 2022/0206692 | A1 | 6/2022 | Choi et al. | |

FOREIGN PATENT DOCUMENTS

| KR | 20060021098 A | * | 3/2006 | ............. G11C 5/145 |
|---|---|---|---|---|
| KR | 20070075104 A | * | 7/2007 | ......... G06F 12/0866 |

* cited by examiner

METHOD OF DECOMMISSIONING A SOLID-STATE DRIVE

RELATED APPLICATION

The present U.S. non-provisional patent application is related to and claims priority benefit of an earlier-filed U.S. provisional patent application titled "Method of Decommissioning a Solid-State Drive," Ser. No. 63/687,091, filed Aug. 26, 2024. The entire content of the identified earlier-filed application is incorporated by reference as if fully set forth herein.

FIELD

The present disclosure relates to solid-state drives and methods of implementing them, and more particularly, the various examples described herein concern a method of decommissioning solid-state drives by permanently disabling command sequences, internal communication channels, and interfaces.

BACKGROUND

Solid-state drives (SSD) use non-volatile memory (NVM) media (e.g., NAND-based memory media) for data storage, and typically include application-specific integrated circuit (ASIC) controllers for managing read, write, and other operations. SSDs are typically used in high-performance computing (HPC) applications, including artificial intelligence (AI), and enterprise computing data center solutions (DCS). It is generally desirable to improve the performance and reduce the cost of SSDs, but it can be difficult to do so.

This background discussion is intended to provide related information, and is not necessarily prior art.

SUMMARY

Examples provide a method of decommissioning SSDs. Broadly, examples decommission SSDs by permanently disabling command sequences, internal communication channels, and interfaces in the NVM media and the controller. Examples eliminate the ability to enter or receive a command sequence that is required to access the data, so that even if the NVM media is removed and connected to a working controller it still cannot be accessed. Examples advantageously provide for securely and permanently decommissioning SSDs so that their data is rendered inaccessible, while minimizing the impact on operations, power, and other resources.

In an example, a method of decommissioning an SSD may include the operations set forth below. The SSD may include an NVM media and a controller. The NVM may be permanently disabled by enabling a short circuit path for an internal high voltage generator to an electrical ground so that a high voltage cannot be generated for an operation required to access the NVM media. Further, an ability of an NVM media interface to initiate a command sequence that is required to access the NVM media may be disabled. The controller may be permanently disabled by disabling an ability of a flash interface to communicate with the NVM media so that no commands can be received by the NVM media.

The preceding examples may further include any one or more of the following features. The NVM media may be a NAND-based memory media. Enabling the short circuit path for the internal high voltage generator to the electrical ground may include breaking down an oxide in a one-time programmable (OTP) element. Disabling the ability of the NVM media interface to initiate the command sequence may include breaking down an oxide in an OTP element. Permanently disabling the NVM may further include issuing a status confirmation indicating that the NVM media has been disabled. Permanently disabling the NVM may further include broadcasting a disable command to an entire population of memory elements of the NVM. Permanently disabling the NVM media may further include disabling a global decoding signal. Disabling the ability of the flash interface to communicate with the NVM media may involve breaking down an oxide in an OTP element. Permanently disabling the NVM media and the controller may further include disabling a charge pump in the internal high voltage generator. Permanently disabling the NVM media and the controller may further include electrically grounding a high voltage input from a write-protect pin and a virtual pin port pin.

This summary is not intended to identify essential features of the examples, and is not intended to be used to limit the scope of the claims. These and other aspects of the present examples are described below in greater detail.

DRAWINGS

Examples are described in detail below with reference to the attached drawing figures, wherein.

Figure 1:
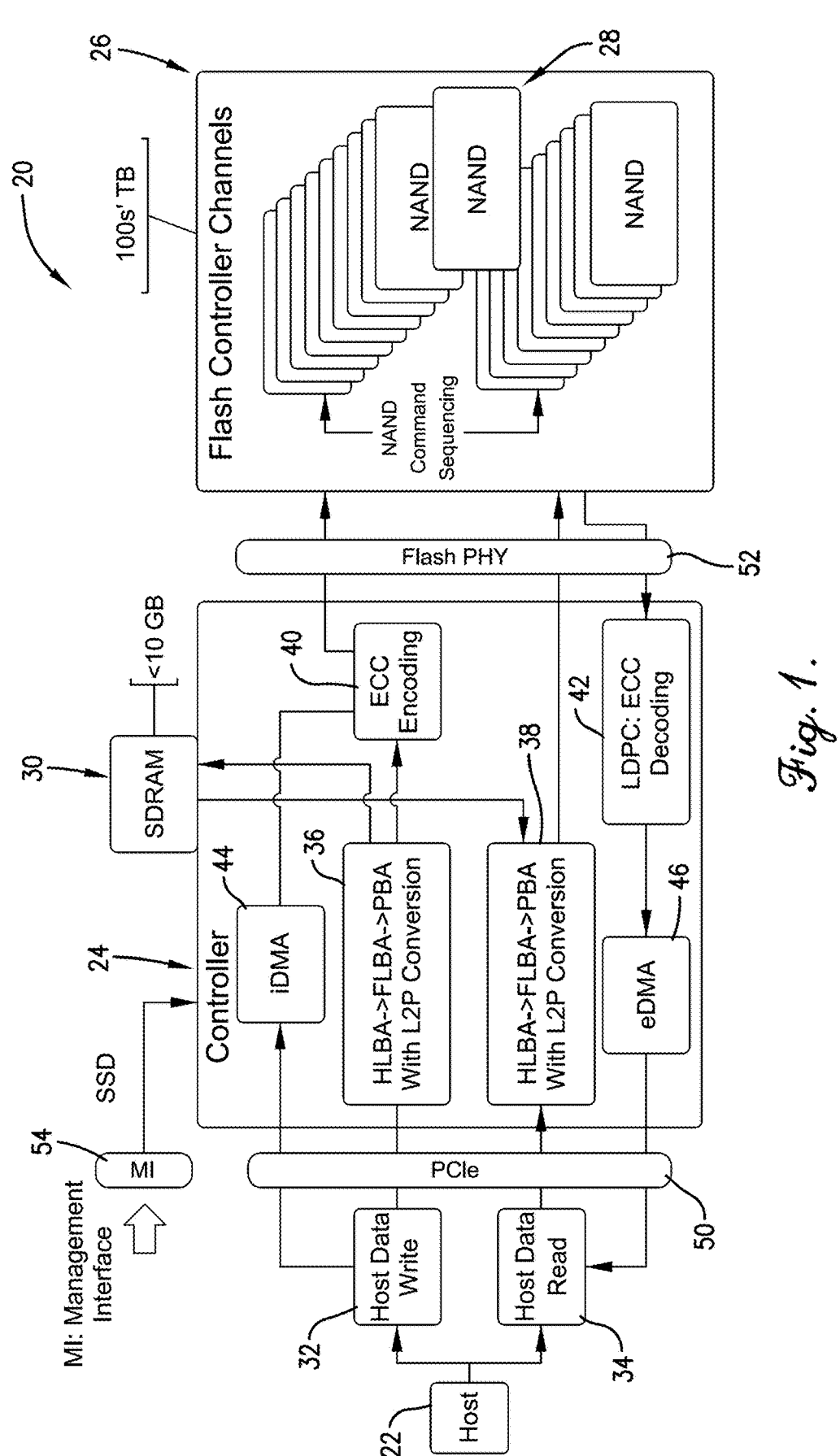
FIG. 1 is a high-level block diagram of components and operations of an SSD.

The figures are not intended to limit the examples to the specific details depict. The drawings are not necessarily to scale.

DETAILED DESCRIPTION

In the following detailed description, reference is made to the accompanying drawings, which form a part hereof and in which are shown, by way of illustration, specific examples in which the present disclosure may be practiced. These examples are described in sufficient detail to enable a person of ordinary skill in the art to practice the present disclosure. However, other examples may be utilized, and structural, material, procedural, operational, and other changes may be made without departing from the scope of the disclosure. Unless clearly understood or expressly identified otherwise, structures, materials, procedures, operations, and other aspects described in the context of one example may be incorporated into other examples.

The illustrations presented herein are not meant to be actual views of any particular method, system, device, or structure, but are merely idealized representations that are employed to describe the examples of the present disclosure. The drawings presented herein are not necessarily drawn to scale. Similar structures or components in the various drawings may retain the same or similar numbering for the convenience of the reader; however, any similarity in numbering does not necessarily mean that the structures or components are necessarily identical in size, composition, configuration, or any other property.

Terms of relative location and direction (e.g., above, below, left, right, upper, lower) may be used to facilitate the present descriptions of examples with reference to the figures, but unless clearly understood or expressly identified otherwise, these terms are not meant to be limiting with regard to location, direction, or overall orientation, and may, for example, change as a result of a change in overall orientation.

It will be readily understood that the components of the examples as generally described herein and illustrated in the drawings could be arranged and designed in a wide variety of different configurations. Thus, the following description of various examples is not intended to limit the scope of the present disclosure but is merely representative of various examples.

Data centers employ large numbers of hyper-scale SSDs that are under constant workload and, as a result, regularly wear out and need to be decommissioned from service. If one hundred million new SSDs are currently being installed annually, then a similar number will need to be decommissioned in approximately five years. Data centers are busy providing their normal data services and may lack the time, manpower, and technical resources to safely and securely decommission large numbers of SSDs. Conventionally, decommissioning involves a host initiating a command sequence to erase the data on an SSD. The data may be destroyed using a variety of electrical erase schemes, such as crypto erase, secure erase, and flash fill of the NAND blocks. However, the erase operation is one of the longest operations for the SSD to perform, consumes a large amount of power, and occupies considerable system bandwidth, so even though the SSD is no longer in service it is still a drain on the host's resources during decommissioning. Further, if the erase operation fails, it may not be possible to fully erase the data. The SSD may be physically destroyed and recycled, though this process has undesirable costs and environmental impacts, but it is still generally desirable to destroy the data before the drive is turned over to a third-party to be destroyed. SSDs that contain data, whether up-to-date or out-of-date, may be security threats if they are not properly disposed of when they are decommissioned. Under some circumstances (e.g., the imminent loss of sensitive technology) it may be desirable to quickly render the data on the SSD inaccessible but waiting for an erase operation or physically destroying the SSD is impractical.

Examples of the present disclosure provide a method of more securely decommissioning SSDs by permanently disabling the NVM media and the controller in the SSD. Broadly, decommissioning is achieved by permanently disabling command sequences, internal communication channels, and interfaces in the NVM media and the controller. Examples eliminate the ability to enter or receive a command sequence that is required to access the data, so that even if the NVM media is removed and connected to a working controller it still cannot be accessed. Examples may implement a special NVM mode that can fully and permanently disable the NAND command sequence operation, and also use the controller's electronic fuse (eFuse) or other OTP element setting to permanently disable the command sequencing capability. Generally, the controller is used in the process of disabling the NVM media, so the controller will be disabled after the NVM media is disabled. Examples advantageously enable data centers to securely and permanently disable decommissioned SSDs so that their data is inaccessible, while minimizing the impact to the data center's operations, power, and other resources.

Referring to FIG. 1, a high-level block diagram of components, operations, and an operating context of an SSD 20 is shown including a host 22 configured to write and read data to and from the SSD 20; a controller 24 configured to control various SSD operations, such as those discussed below; and an NVM media 26, such as a NAND-based memory media in the form of a plurality of NAND dies 28. Each NAND die 28 may include one or more planes, each plane may include multiple blocks, each block may include multiple pages, and each page may include multiple cells. Each block may be arranged as an array of wordlines (WLs) and bitlines (BLs), with each WL representing a page. Although described herein with regard to NAND-based memory media, examples may employ substantially any suitable memory array technology, such as NOR-based memory media and dynamic random access memory (DRAM).

Generally, the SSD 20 may operate as follows. A write or read request may be received from the host 22 via a peripheral component interconnect express (PCIe) or other suitable interface 50. PCIe is a standardized interface for motherboard components. The controller 24 may use logical block addresses (LBAs) and physical block addresses (PBAs) to facilitate access for data storage in and retrieval from the NVM 26. LBAs are an abstraction to allow the operating system to interact with the NVM 26, and PBAs represent the actual hardware locations within the NVM 26. To facilitate interacting with the NVM 26, the controller 24 may create an entry or record that assigns an LBA to a PBA. To keep track of all such LBA-to-PBA assignments, the controller 24 may use a logical-to-physical (L2P) mapping table. The L2P table may be uploaded to synchronous dynamic random access memory (SDRAM) 30 so that it can be more quickly accessed and updated by the controller 24. When a write or read data request 32, 34 is received from the host 22, the controller 24 performs a reference operation 36, 38 to the L2P mapping table to determine the PBA within the NVM 26 corresponding to a desired LBA. Once the PBA is determined, the controller 24 accesses the appropriate NVM cell to write or read the data.

Access to the NVM 26 may be via a flash physical (PHY) or other suitable interface 52. The controller 24 may employ an error correction code (ECC) operation 40, 42 during encoding and decoding of data to detect and correct errors and enhance data integrity. Additionally, the SSD 20 may support a direct memory access (DMA) operation 44, 46 enabling data to be written from the host 22 directly to the NVM 26 and read from the NVM 26 directly to the host 22. Certain commands, such as the disablement commands described herein, may be issued to the controller 24 using the host command layer, or non-volatile memory express management (NVMe-MI) or other suitable interface 54. During the decommissioning of the SSD 20, examples quickly disable the controller 24 and the ability to access the NVM media 26 so that not only is the SSD 20 disabled but it is also no longer possible to remove and access the data any other way because the NVM media 26 is no longer able to receive any command sequence via the PCIe 50, flash PHY 52, or NVMe-MI 54 interfaces. Some or all of the functions of the SSD 20 may be reflected in the operations of the method 120 described below.

Figure 2:
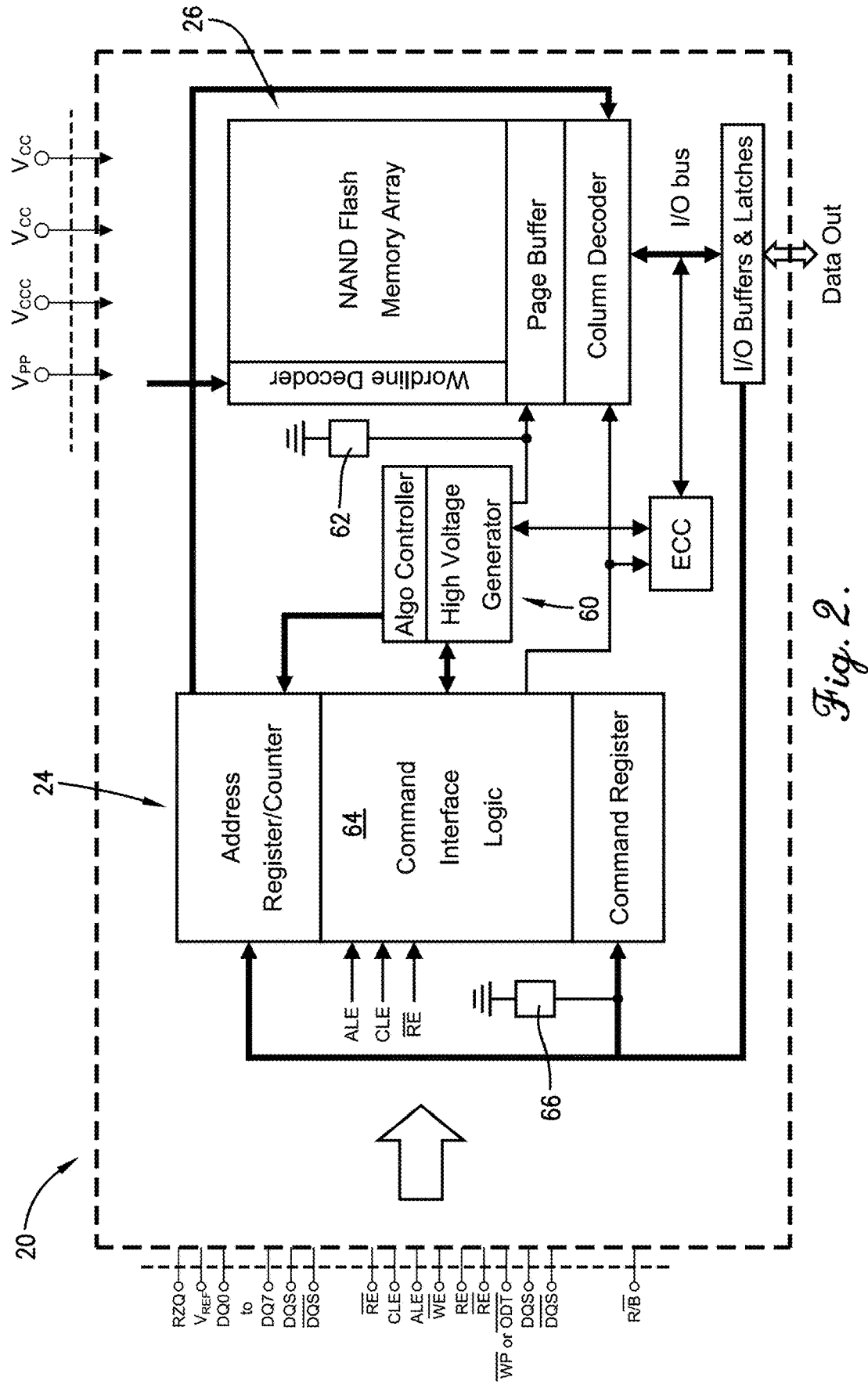
FIG. 2 is a high-level block diagram of certain components of the SSD of FIG. 1, including a high voltage generator and OTP elements.
Figure 3:
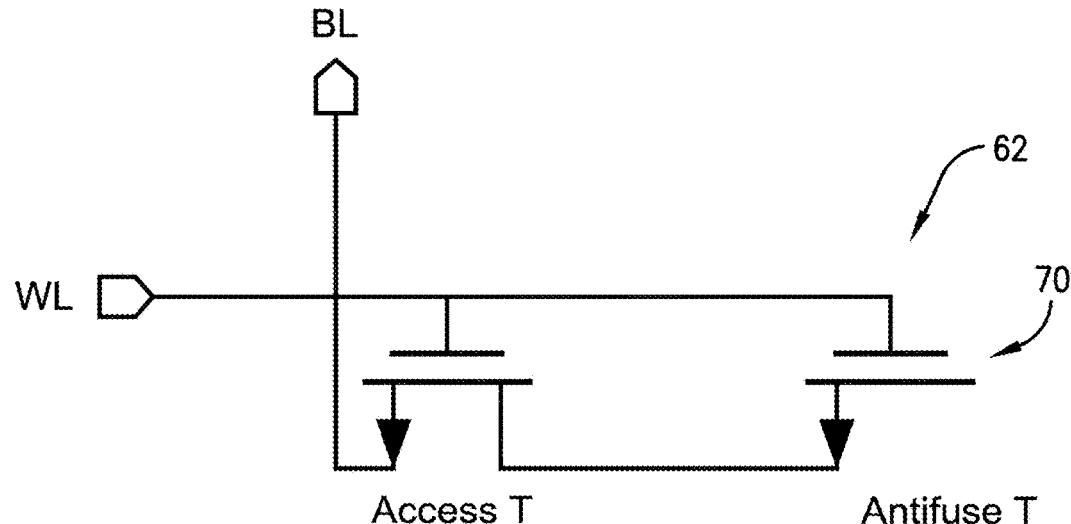
FIG. 3 is a schematic view of an OTP element.
Figure 4:
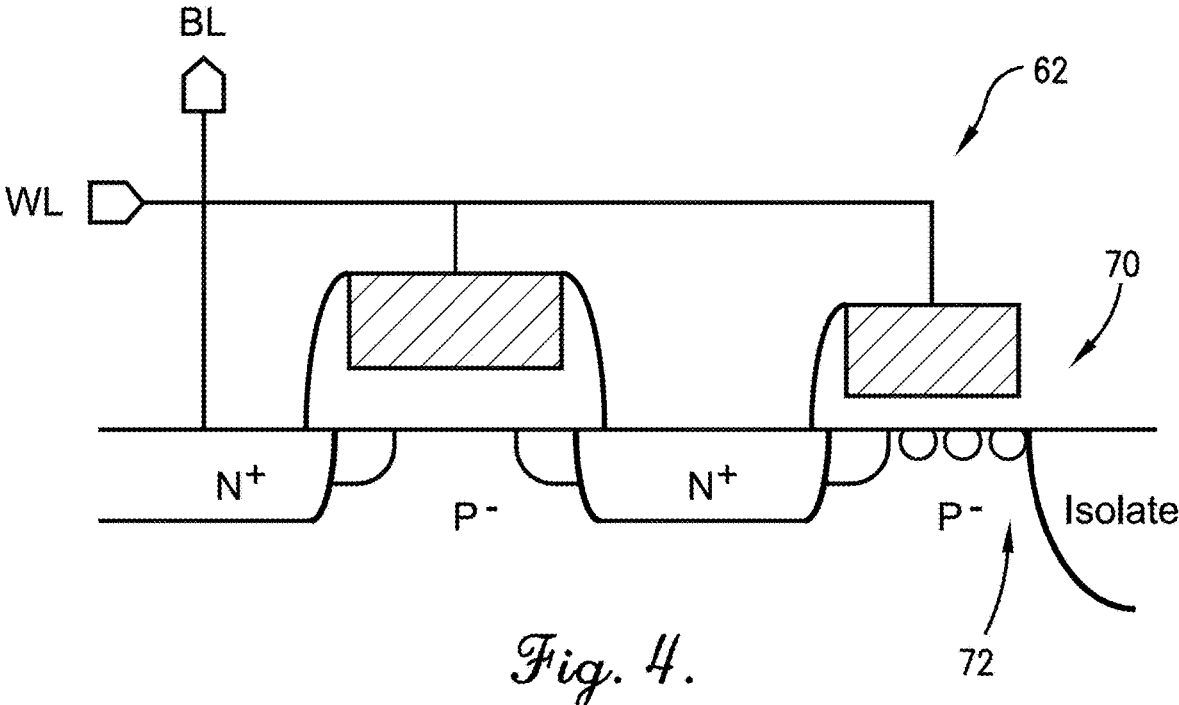
FIG. 4 is a cross-sectional block diagram showing details of an OTP element.

Referring also to FIGS. 2-4, the SSD 20 further includes a high voltage generator 60 (seen in FIG. 2) that can be disabled with an eFuse, antifuse, or other OTP element 62 (seen in detail in FIGS. 3 and 4) that can only be written to once. Without the high voltage generator 60, there is no ability to bias the WLs and BLs and therefore no ability read the data. The controller 24 also includes a command state machine logic layer 64 (seen in FIG. 2) that can be similarly disabled with an OTP element 66. The irreversible and permanent use of OTP elements involves purposefully breaking-down an oxide layer 70 in a transistor 72 in these devices (seen in FIG. 4). A "Disable Signal" may be added to disable the internal charge pumps, such as the clock (CLK) drivers, in the high voltage generator 60. As a result, the NAND will fail the "Status for the Access" timeout. The Disable Signal may be sent to the command interface 54 to disable the controller 24 in the same way.

Additionally or alternatively, the high voltage output of the generator 60 may be grounded to disable the NVM media 26. The controller 24 may be disabled in the same way. Additionally or alternatively, the high voltage input from the controller's write-protect (WP)/virtual pin port (VPP) pins (FIG. 2) may be grounded to disable the NVM media 26. The controller 24 may be disabled in the same way. Additionally or alternatively, the global decoding signals may be disabled to disable the NVM media 26.

Figure 5:
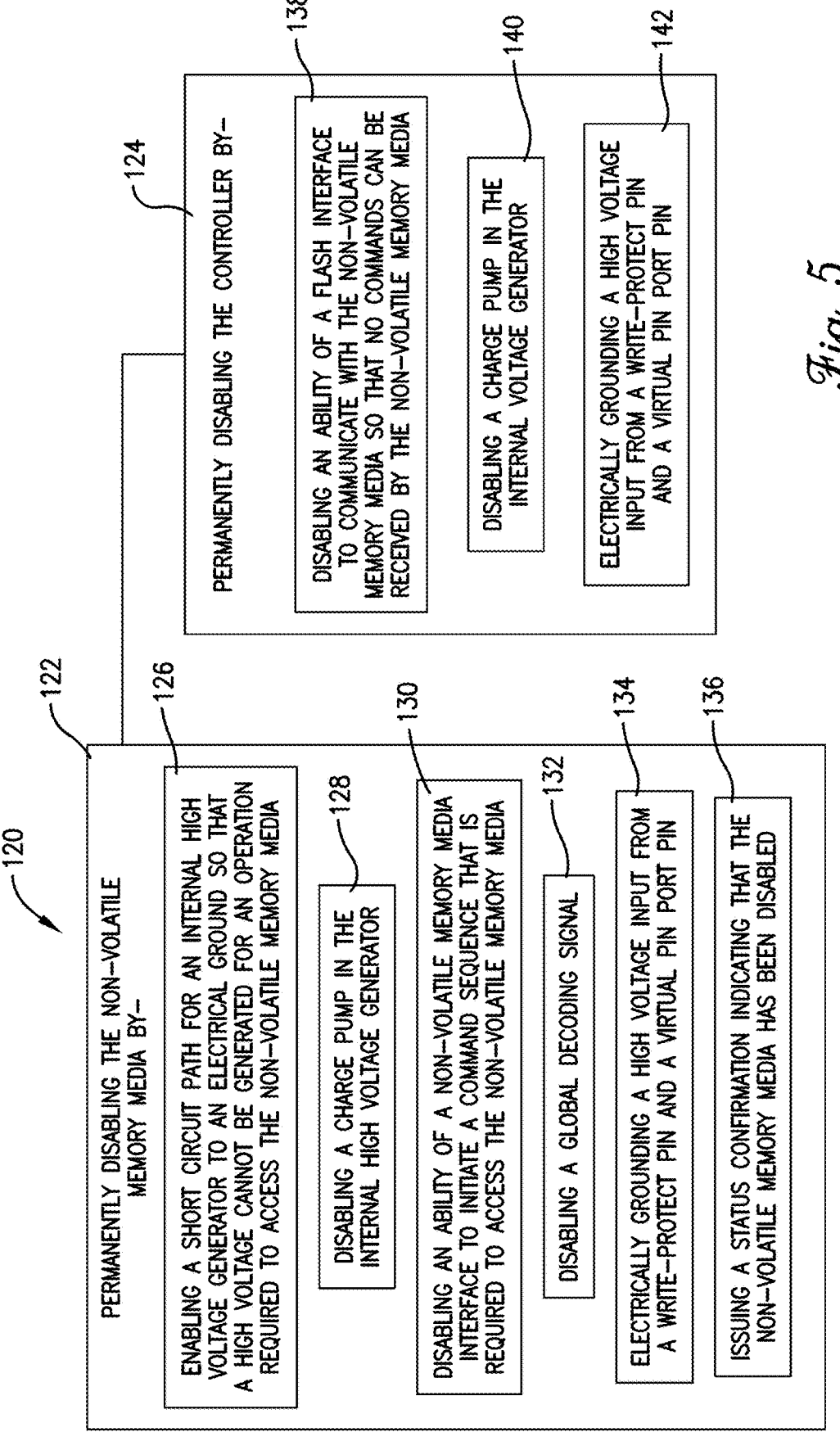
FIG. 5 is a flowchart of operations in an example of a method of decommissioning SSDs.

Referring to FIG. 5, an example of a method 120 of decommissioning an SSD 20 may include the operations set forth below. The method 20 begins with an SSD to be decommissioned (for example, the SSD 20, described above), and, as desired or necessary, approval to permanently disable the SSD. Generally, the controller is used in the process of disabling the NVM media, so the controller will be disabled after the NVM media is disabled. As in the example described above, the SSD 20 may include a controller 24 and a NAND-based or other NVM media 26. Some or all of the operations of the method 120 may be reflected in or correspond to the functions of the SSD 20 described above.

Broadly, the method 120 may include permanently disabling the NVM 26, as shown in 122, and permanently disabling the controller 24, as shown in 124. With regard to the NVM media 26, a disablement command may be issued to execute a disablement mode using the host command layer, NVMe-MI 54, with a management component transport protocol (MCTP) through a system management bus (SMBus). This may be done with or without the participation of the host 22. The disablement mode may only be executable with special permission from the controller 24 and with a vendor-specific command. Once the disablement mode is entered, permanently disabling the NVM media 26 may include any one or more of the following operations.

A short circuit path may be enabled for an internal high voltage generator to an electrical ground so that a high voltage cannot be generated for an operation required to access the NVM media 26, as shown in 126. In particular, without the high voltage generator 40, there is no ability to bias the WLs and BLs and therefore no ability read the data. The short circuit path may be enabled using an electrical eFuse, antifuse, or other OTP element on the NAND die. The ability to trigger OTP elements may be limited to the host or the vendor of the SSD. Disabling the high voltage generator 40 may include disabling (e.g., shorting to ground) an internal charge pump so that no high voltage can be generated for any NVM operation, as shown in 128.

An ability of an NVM media interface 52 to initiate a command sequence that is required to access the NVM media 26 may be disabled, as shown in 130. This may be achieved with an OTP element, as discussed above. A global decoding signal may be disabled, as shown in 132. A high voltage input from a write-protect pin and a virtual pin port pin may be electrically grounded, as shown in 134. A status confirmation may be issued to indicate that the NVM 26 has been successfully disabled, as shown in 136. All or some of the foregoing operations may be accomplished with broadcast commands for the entire NVM population in the SSD 20.

With regard to the controller 24, a disablement command may be issued to execute a disablement mode using the host command layer, NVMe-MI 54 through the SMBus. Once the disablement command is issued, permanently disabling the controller 24 may include any one or more of the following operations. The ability of a flash interface physical (PHY) layer 52 to communicate with the NVM may be disabled with an OTP element to permanently disengage the NAND dies, as shown in 138. The high voltage generator 40, or internal charge pump, may be disabled (e.g., shorted to ground) so that no high voltage can be generated for any controller operation involving the NVM media 26, as shown in 140. A high voltage input from a write-protect pin and a virtual pin port pin may be electrically grounded, as shown in 142.

While the present disclosure has been described herein with respect to certain illustrated examples, those of ordinary skill in the art will recognize and appreciate that the present disclosure is not so limited. Rather, many additions, deletions, and modifications to the illustrated and described examples may be made without departing from the scope of the disclosure as hereinafter claimed along with their legal equivalents. In addition, features from one example may be combined with features of another example while still being encompassed within the scope of the disclosure as contemplated by the inventors.

The invention claimed is:

1. A method of decommissioning a solid-state drive, the solid-state drive including a non-volatile memory media and a controller, the method comprising:

permanently disabling the non-volatile memory media by— enabling a short circuit path for an internal high voltage generator to an electrical ground so that a high voltage cannot be generated for an operation required to access the non-volatile memory media, and disabling an ability of a non-volatile memory media interface to initiate a command sequence that is required to access the non-volatile memory media; and permanently disabling the controller by— disabling an ability of a flash interface to communicate with the non-volatile memory media so that no commands can be received by the non-volatile memory media.

2. The method of claim 1, wherein the non-volatile memory media is a NAND-based memory media.

3. The method of claim 1, wherein enabling the short circuit path for the internal high voltage generator to the electrical ground includes breaking down an oxide in a one-time programmable element.

4. The method of claim 1, wherein disabling the ability of the non-volatile memory media interface to initiate the command sequence includes breaking down an oxide in a one-time programmable element.

5. The method of claim 1, wherein permanently disabling the non-volatile memory media further includes issuing a status confirmation indicating that the non-volatile memory media has been disabled.

6. The method of claim 1, wherein permanently disabling the non-volatile memory media further includes broadcasting a disable command to an entire population of memory elements of the non-volatile memory media.

7. The method of claim 1, further including permanently disabling the non-volatile memory media by disabling a global decoding signal.

8. The method of claim 1, wherein disabling the ability of the flash interface to communicate with the non-volatile memory media includes breaking down an oxide in a one-time programmable element.

9. The method of claim 1, further including permanently disabling the non-volatile memory media and the controller by disabling a charge pump in the internal high voltage generator.

10. The method of claim 1, further including permanently disabling the non-volatile memory media and the controller by electrically grounding a high voltage input from a write-protect pin and a virtual pin port pin.

11. A method of decommissioning a solid-state drive, the solid-state drive including a non-volatile memory media and a controller, the method comprising:

permanently disabling the non-volatile memory media by— breaking down a first oxide in a first one-time programmable element to enable a short circuit path for an internal high voltage generator to an electrical ground so that a high voltage cannot be generated for an operation required to access the non-volatile memory media, breaking down a second oxide in a second one-time programmable element to disable an ability of a non-volatile memory media interface to initiate a command sequence that is required to access the non-volatile memory media, and issuing a status confirmation indicating that the non-volatile memory media has been disabled; and permanently disabling the controller by— breaking down a third oxide in a third one-time programmable element to disable an ability of a flash interface to communicate with the non-volatile memory media so that no commands can be received by the non-volatile memory media.

12. The method of claim 11, wherein the non-volatile memory media is a NAND-based memory media.

13. The method of claim 11, wherein permanently disabling the non-volatile memory media further includes broadcasting a disable command to an entire population of memory elements of the non-volatile memory media.

14. The method of claim 11, further including permanently disabling the non-volatile memory media by disabling a global decoding signal.

15. The method of claim 11, further including permanently disabling the non-volatile memory media and the controller by disabling a charge pump in the internal high voltage generator.

16. The method of claim 11, further including permanently disabling the non-volatile memory media and the controller by electrically grounding a high voltage input from a write-protect pin and a virtual pin port pin.

17. A method of decommissioning a solid-state drive, the solid-state drive including a non-volatile memory media and a controller, the method comprising:

permanently disabling the non-volatile memory media by— enabling a short circuit path for an internal high voltage generator to an electrical ground so that a high voltage cannot be generated for an operation required to access the non-volatile memory media, and disabling an ability of a non-volatile memory media interface to initiate a command sequence that is required to access the non-volatile memory media; and broadcasting a disable command to an entire population of memory elements of the non-volatile memory media, and disabling a global decoding signal; and permanently disabling the controller by— disabling an ability of a flash interface to communicate with the non-volatile memory media so that no commands can be received by the non-volatile memory media.

18. The method of claim 17, wherein the non-volatile memory media is a NAND-based memory media.

19. The method of claim 17, further including permanently disabling the non-volatile memory media and the controller by disabling a charge pump in the internal high voltage generator.

20. The method of claim 17, further including permanently disabling the non-volatile memory media and the controller by electrically grounding a high voltage input from a write-protect pin and a virtual pin port pin.

* * * * *